United States Patent [19]
Elledge et al.

[11] Patent Number: 5,906,037
[45] Date of Patent: May 25, 1999

[54] METHOD OF FORMING FLAT PANEL DISPLAY

[75] Inventors: Jason B. Elledge; James Hofmann, both of Boise, Id.

[73] Assignee: Micron Technology, Inc., Boise, Id.

[21] Appl. No.: 08/797,779

[22] Filed: Feb. 7, 1997

[51] Int. Cl.$^6$ .................................................. B23P 17/00
[52] U.S. Cl. .................. 29/419.1; 264/1.25; 425/392; 425/394
[58] Field of Search ................... 29/419.1, 458; 264/1.24, 1.25, 1.28, 2.7; 425/392, 394, 395, 398

[56] References Cited

U.S. PATENT DOCUMENTS

| | | | |
|---|---|---|---|
| 3,216,807 | 11/1965 | Woodcock | 65/4 |
| 3,275,428 | 9/1966 | Siegmund | 65/4 |
| 3,558,377 | 1/1971 | Tantillo | 156/25 |
| 3,904,343 | 9/1975 | Scott, Jr. | 425/472 |
| 3,979,621 | 9/1976 | Yates | 313/105 CM |
| 3,979,637 | 9/1976 | Siegmund | 315/12 R |
| 3,990,874 | 11/1976 | Schulman | 65/4 B |
| 4,021,216 | 5/1977 | Asam et al. | 65/4 B |
| 4,101,303 | 7/1978 | Balkwill | 65/31 |
| 4,126,804 | 11/1978 | Asam et al. | 313/105 CM |
| 4,127,398 | 11/1978 | Singer, Jr. | 65/4 A |
| 5,063,327 | 11/1991 | Brodie et al. | 313/482 |
| 5,223,013 | 6/1993 | Cook et al. | 65/4.2 |
| 5,708,325 | 1/1998 | Anderson et al. | 313/495 |

*Primary Examiner*—Peter Vo
*Assistant Examiner*—Bobby Rushing, Jr.
*Attorney, Agent, or Firm*—Seed and Berry LLP

[57] ABSTRACT

A hexagonal mold is formed by a unitary base and a unitary cover. Each of the base and the cover form three of the six surfaces of a hexagonal mold cavity when the cover is placed on top of the base. The hexagonal mold may be used to form field emission display spacers and field emission display microchannels by placing etchable single fibers in the hexagonal mold to form hexagonal multiple fiber preforms. The preforms are then drawn to form multiple fibers that are placed in a rectangular mold to form a rectangular fiber block. The rectangular fiber block is then sliced into sheets which are then placed between a field emission display baseplate and a field emission display faceplate.

22 Claims, 4 Drawing Sheets

METHOD OF FORMING FLAT PANEL DISPLAY

STATEMENT AS TO GOVERNMENT RIGHTS

In Patent Applications

This invention was made with government support under Contract No. DABT-63-93-C-0025 by Advanced Research Projects Agency (ARPA). The government has certain rights to this invention.

TECHNICAL FIELD

This invention relates to molds for forming a bundle of fibers into a unitary mass, and more particularly, to a mold forming a plurality of fibers into a mass with relatively little spatial distortion.

BACKGROUND OF THE INVENTION

Figure 1:
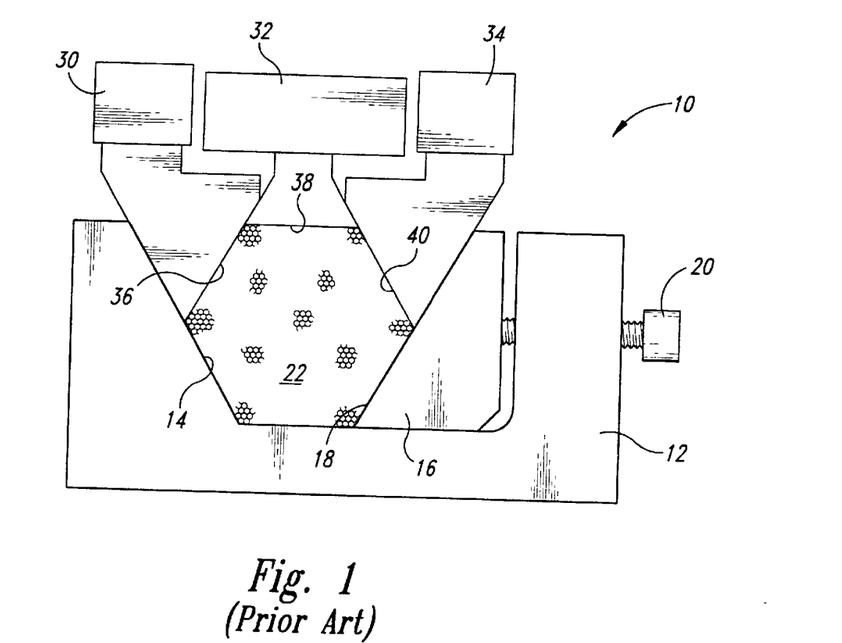
FIG. 1 is a cross-sectional view of a prior art hexagonal mold of the type described in U.S. Pat. No. 3,904,343 to Scott, Jr.

Molds are conventionally used to form a fiber bundle into a unitary mass having a cross-sectional shape corresponding to the shape of the mold. For example, U.S. Pat. No. 3,904,343 to Scott, Jr. discloses a mold for forming a bundle of glass fibers into a hexagonal mass. A conventional hexagonal mold 10 of the type shown in the patent to Scott, Jr. is shown in FIG. 1. The mold 10 includes an angle block 12 having a first hexagonal surface 14 and an angle block 16 having a second hexagonal surface 18. The angle block 16 moves laterally in the channel member 14 responsive to rotation of a jack screw 20. A hexagonal bundle 22 of fibers is placed in the bottom portion of the mold formed by the channel member 14 and angle block 16. Three upper angle blocks 30, 32, 34, each of which has a respective hexagonal surface 36, 38, 40, is then placed on the bundle 22. The upper angle blocks 30, 32, 34 move downwardly to compress the bundle 22 during the molding operation. Also, the angle block 16 may move laterally to compress the bundle 22. It will be apparent that the angle blocks 30, 32, 34 move not only relative to the channel member 12, but also relative to each other. Under these circumstances, the fiber bundle 22 will accurately assume a hexagonal configuration only if the hexagonal symmetry of the angle blocks 30, 32, 34 is maintained while the blocks move relative to each other. However, since there is no mechanism to ensure that symmetry is maintained, the prior art mold 10 may be incapable of forming hexagonal fiber masses with sufficient accuracy.

There is therefore a need for a mold that can accurately form a bundle of fibers into a hexagonal mass without spatial distortion.

SUMMARY OF THE INVENTION

According to one aspect of the invention, a mold is specially adapted for forming a plurality of fibers into a bundle having a hexagonal cross-sectional shape. The mold includes a base and a unitary cover. The base has an upwardly facing lower cavity defined by a bottom surface and a pair of side walls. The side walls extend from opposite sides of the bottom surface upwardly away from each other at approximately 120 degrees with respect to the bottom surface. As a result, the bottom surface and side walls together define one-half of a hexagon. The unitary cover has a downwardly facing upper cavity defined by a top surface and a pair of side walls. The side walls extend from opposite sides of the top surface downwardly away from each other at approximately 120 degrees with respect to the top surface. As a result, the top surface and side walls together also define one-half of a hexagon. The mold base is adapted to receive the mold cover with the upper and lower cavities facing each other so that the upper and lower cavities define a hexagonal mold cavity. Since the cover is unitary rather than formed by a plurality of sections that are movable relative to each other, the mold cavity accurately maintains a hexagonal shape.

The mold may be used to mold a plurality of single fibers into a multiple fiber preform having a cross-sectional shape of a hexagon by placing a plurality of single fibers into the base before placing the unitary cover over the mold base. During the molding process, the mold base is preferably forced against the mold cover to compress the fibers in the mold cavity. The fibers may also be heated while they are being compressed in the mold cavity.

The hexagonal multiple fiber preform formed using the mold may be used for a variety of purposes. For example, a plurality of hexagonal preforms may be molded into a fiber block by drawing the hexagonal multiple flow preform into a hexagonal multiple fiber, and then placing a plurality of hexagonal multiple fibers in a mold cavity preferably along with multiple fibers having a cross-sectional shape of a half-hexagon. The hexagon and half-hexagon multiple fibers are arranged in the mold so that the half-hexagon multiple fibers fill respective spaces formed between adjacent hexagon multiple fibers and the bottom of the mold base. A cover is then placed over the mold cavity and the multiple fibers are molded into a unity of fiber blocks.

The fiber block can be sliced into a thin sheet and used for such purposes as a spacer for a flat panel display and a microchannel plate for a field emission display. A flat panel display spacer is formed by placing single fibers in the hexagonal mold that have an inner core and an outer cladding that is selectively removable from the inner core. One face of a thin sheet sliced from the fiber block is attached to either a baseplate or a faceplate of the flat panel display. The outer cladding is then removed from the inner core, such as by etching, thereby leaving strands of material formed from the inner core attached to the baseplate or the faceplate of the flat panel display. The other face of the sheet is then attached to the other of the baseplate or faceplate so that the strands of core material space the baseplate and faceplate apart from each other.

A microchannel plate for a field emission display is formed by placing single fibers in the hexagonal mold that have an inner core that is selectively removable from the outer cladding. A thin sheet sliced from the fiber block is mounted within a space formed between the baseplate and the faceplate of the field emission display. After mounting the slice of fiber block in the display, the inner core is selectively removed from the outer cladding by a suitable procedure, such as by etching. As a result, a sheet having a large number of channels corresponding to the outer claddings is formed between the baseplate and the faceplate of the field emission display.

DETAILED DESCRIPTION OF THE INVENTION

Figure 2:
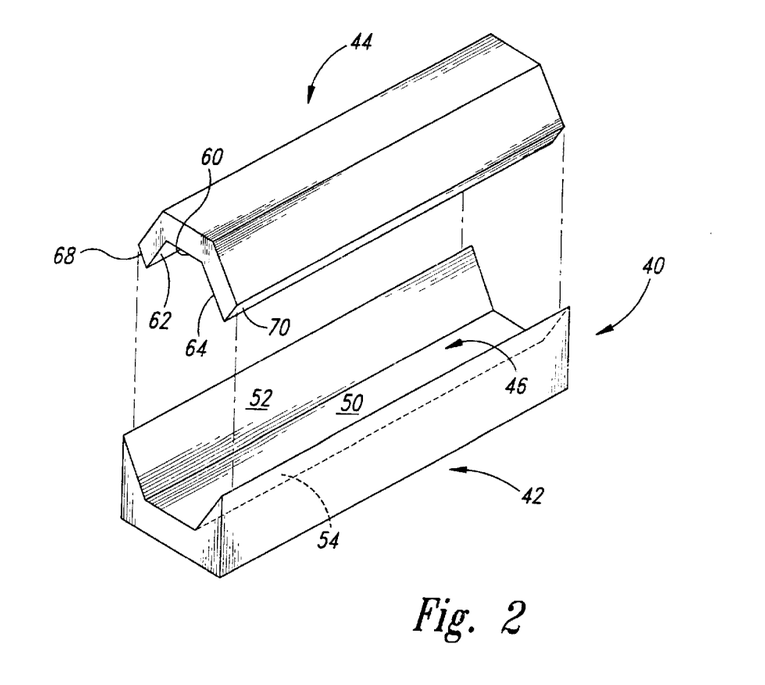
FIG. 2 is an isometric view of a preferred embodiment of a hexagonal mold in accordance with the invention.
Figure 3:
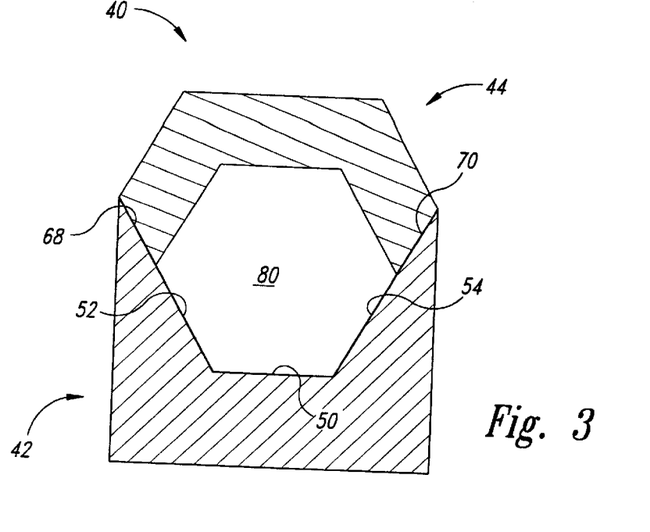
FIG. 3 is a transverse cross-sectional view of the mold of FIG. 2 in its assembled configuration.

A preferred embodiment of a hexagonal mold in accordance with the invention is illustrated in FIGS. 2 and 3. The mold 40 includes a lower base 42 and an upper cover 44. The base 42 includes a half-hexagonal cavity 46 formed by a bottom surface 50 and a pair of sidewalls 52, 54. The sidewalls 52, 54 each intersect the bottom surface 50 at substantially 120°. The mold base 42 may include endwalls (not shown) to enclose the channel 46, although such endwalls are generally not preferred.

The mold cover 44 includes a top surface 60 and a pair of upper sidewalls 62, 64. The sidewalls 62, 64 each intersect the upper surface 60 at substantially 120°. The sidewalls 62, 64 intersect respective edges 68, 70 at substantially 90°. Thus, when the cover 44 is placed on the base 42 as illustrated in FIG. 3, the edge surfaces 68, 70 flushly contact the sidewalls 52, 54, respectively, of the base 42. Significantly, the edge formed by the junction between each sidewall 62, 64 and its adjacent edge surface 68, 70, respectively, intersects the respective sidewall 52, 54 at a distance from the bottom surface 50 that is substantially equal to the width of the bottom surface 50. Similarly, the distance between the lower edge of each sidewall 62, 64 and the intersection of the sidewalls 62, 64 with the top surface 60 is equal to the width of the top surface 60. Thus, when the cover 44 is placed on the base 42 as illustrated in FIG. 3, a hexagonal mold cavity 80 is formed. Significantly, since both the base 42 and the cover 44 have a unitary construction with no moving parts, a plurality of single fibers placed in the mold cavity 80 will be accurately molded into a hexagonal preform.

Figures 4, 5:
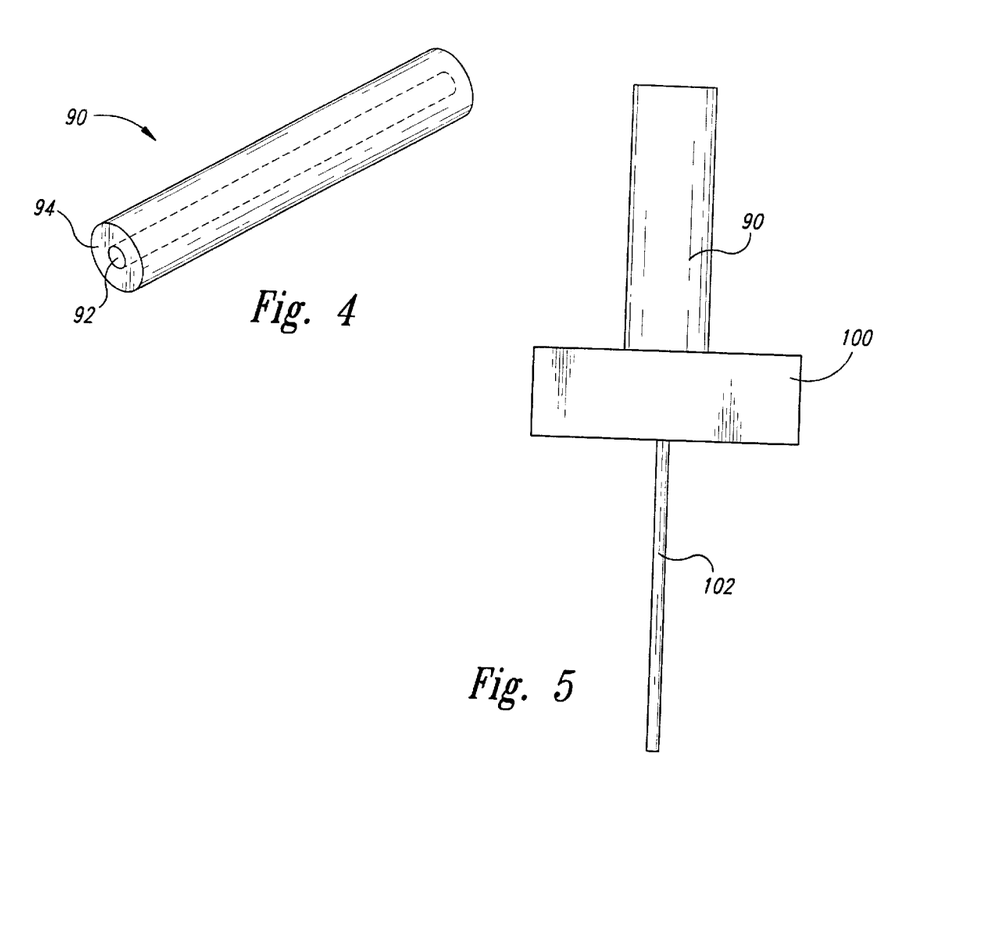
FIG. 4 is an isometric view of a single fiber preform that is adapted to be drawn and placed in the mold of FIGS. 2 and 3.
FIG. 5 is a schematic showing the preform of FIG. 4 being processed through a draw tower to form a single fiber having a decreased width and an increased length.

The hexagonal mold illustrated in FIG. 3 can be used to form a variety of structures that are useful in a wide variety of fields. As illustrated in FIG. 4, a single fiber preform 90 has a core 92 and cladding 94. In using the mold 40 to form field emission display spacers, the core 92 is a non-etchable material, such as Corning 8161 non-etchable glass, and the cladding 94 is of etchable material, such as E6-2 acid etchable glass. In using the mold 40 to fabricate microchannel plates, the core 92 is etchable and the cladding 94 is non-etchable. In the case of field emission display spacers, the preform 90 may have a diameter of about 1½ inches and a core of about ¼ inch.

The single fiber preform 90 is then processed with a conventional draw tower 100 to form a thin, elongated single fiber 102, as shown in FIG. 4. However, although the diameter of the preform 90 has been significantly decreased, the relative proportions between the diameter of the core 92 and the diameter of the cladding 94 remains the same.

Figure 6:
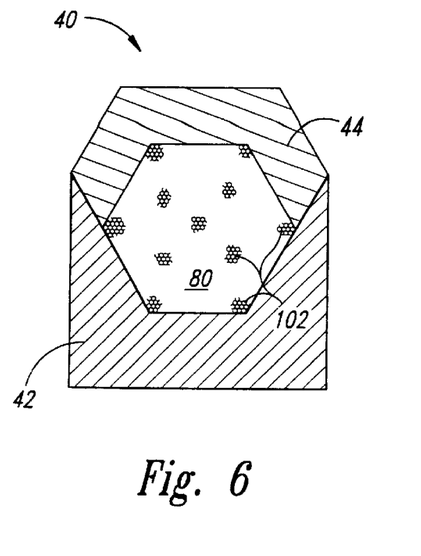
FIG. 6 is a cross-sectional view showing a plurality of single fibers of the type shown in FIG. 5 produced in accordance with the method of FIG. 5 placed in the mold of FIGS. 2 and 3.

After the single fiber 102 has been formed by the draw tower 100 as illustrated in FIG. 5, it is divided into a plurality of segments of a predetermined length and placed in the hexagonal mold 40 as shown in FIG. 6. The single fibers 102 preferably slightly overfill the mold cavity 80 so that they will be compressed by displacement of the cover 44 downwardly against the base 42. This compression of the single fibers 102, preferably in the presence of heat, causes the single fibers 102 to adhere to each other. The mold 40 thus forms the single fibers 102 into a hexagonal multiple fiber preform.

Figure 7:
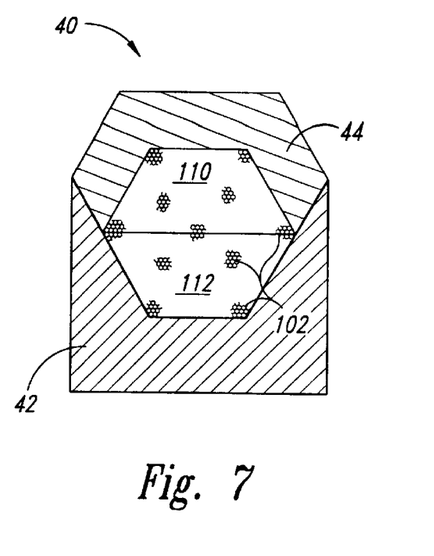
FIG. 7 is a cross-sectional view showing a plurality of single fibers of the type shown in FIG. 5 placed in a half-hexagonal mold resulting from a modification of the mold shown in FIGS. 2 and 3.

In addition to using the mold 40 to form a hexagonal multiple fiber preform, the mold 40 may also be used to form a half-hexagonal multiple fiber preform 102, as illustrated in FIG. 7. More specifically, the upper portion of the mold 40 is filled with a half-hexagonal spacer 110. When the cover 44 is placed on the base 42, the volume between the spacer 110 and the cover 44 forms a half-hexagonal mold cavity 112. The half-hexagonal mold cavity 112 is then preferably slightly overfilled with the single fibers 102. As a result, when the mold cover 44 is forced downwardly, the single fibers 102 are compressed in the mold cavity. This compression of the single fibers, preferably in the presence of heat, forms the single fibers 102 into a half-hexagonal multiple fiber preform. This half-hexagonal preform is used as described below to create either a field emission display spacer or a field emission display microchannel plate.

Figure 8:
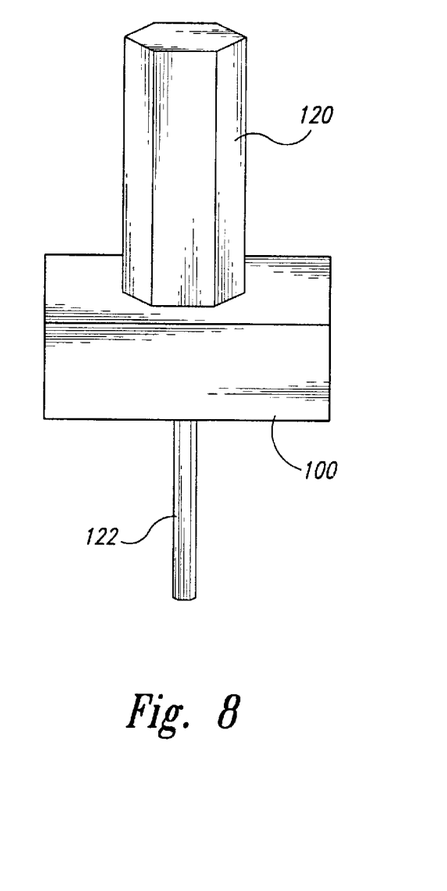
FIG. 8 is a schematic view showing the multiple fiber hexagonal preform produced using the mold of FIG. 6 being processed through a draw tower to form a hexagonal multiple fiber having a reduced width and an increased length.
Figure 9:
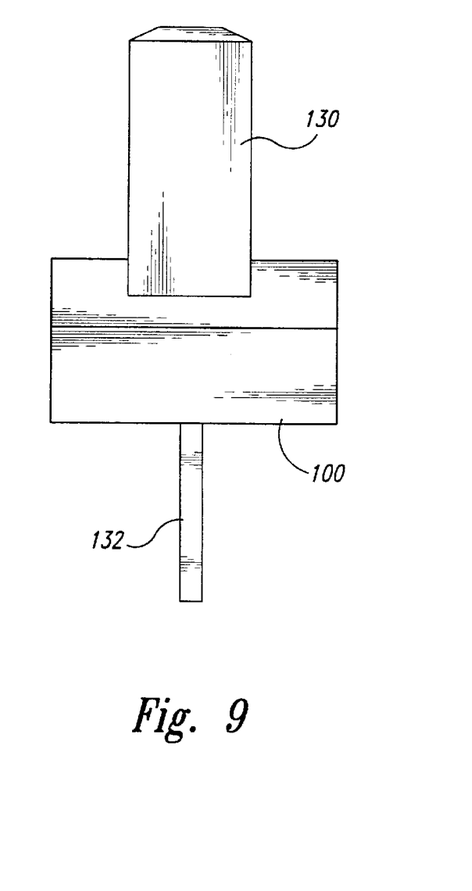
FIG. 9 is a schematic view showing the multiple fiber half-hexagonal preform produced using the mold of FIG. 7 being processed through a draw tower to form a half-hexagonal multiple fiber having a reduced width and an increased length.

With reference to FIGS. 8 and 9, a hexagonal multiple fiber preform 120 formed using the method explained above with reference to FIG. 6, is processed through the draw tower 100 to form a hexagonal multiple fiber 122 having a width that is substantially smaller than the width of the hexagonal preform 120. Similarly, a half-hexagonal multiple fiber preform 130 formed as explained above with reference to FIG. 7, is processed through the draw tower 100 to form a substantially thinner and longer half-hexagonal multiple fiber 132. The hexagonal multiple fiber 122 and the half-hexagonal multiple fiber 132 each consist of a large number of relatively thin strands corresponding to the core 92 equally spaced apart from each other by a distance corresponding to the cladding 94.

Figure 10:
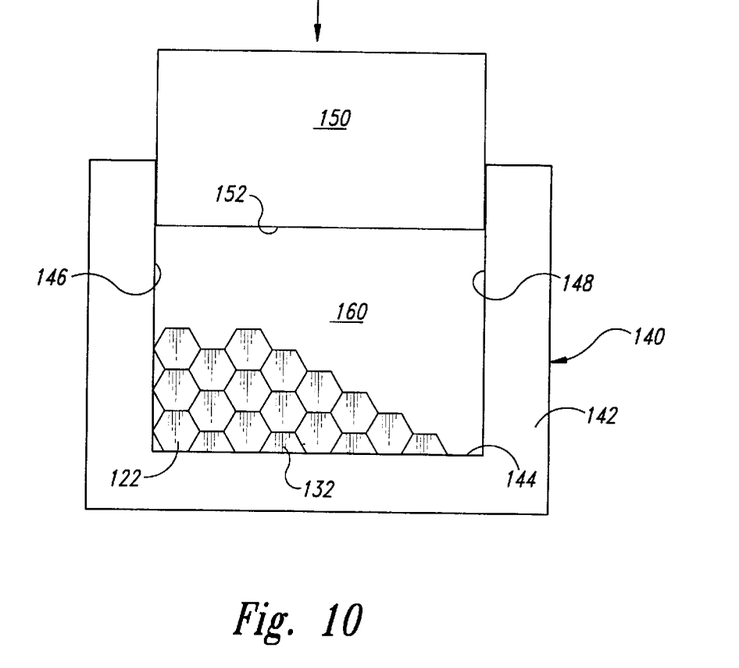
FIG. 10 is a cross-sectional view showing lengths of the hexagonal and half-hexagonal multiple fibers produced according to the steps of FIGS. 8 and 9, respectively, being placed in a rectangular mold.

A plurality of the hexagonal multiple fibers 122 and the half-hexagonal multiple fibers 132 are then preferably placed in a rectangular mold 140 as illustrated in FIG. 10. The rectangular mold 140 includes a base portion 142 formed by a bottom surface 144 and a pair of sidewalls 146, 148 intersecting the bottom surface 144 at a right angle. A rectangular cover 150 has an upper surface 152. When the cover 150 is placed in the base 142, the surfaces 144–148 and 152 form a rectangular mold cavity 160. The hexagonal multiple fibers 122 are placed in the mold cavity 160 as illustrated in FIG. 10. It will be apparent that the multiple hexagonal fibers 122 positioned adjacent the bottom surface 144 form half-hexagonal spaces. These half-hexagonal spaces are filled by placing the half-hexagonal multiple fibers 132 between the hexagonal multiple fibers 122 as illustrated in FIG. 10. Although the half-hexagonal multiple fibers 132 are preferably formed from the single fiber 90 having a core 92 and cladding 94, it may also be formed from a homogeneous fiber (not shown) since a relatively small portion of the mold cavity 160 is filled with the half-hexagonal multiple fibers.

After the hexagonal multiple fibers 122 and the half-hexagonal multiple fibers 132 have been placed in the mold cavity 160, the cover 150 is preferably forced downwardly to compress the fibers 122, 132. This pressure, preferably in the presence of a high temperature, causes the fibers 122, 132 to adhere to each other to form a rectangular fiber block.

Figures 11, 12:
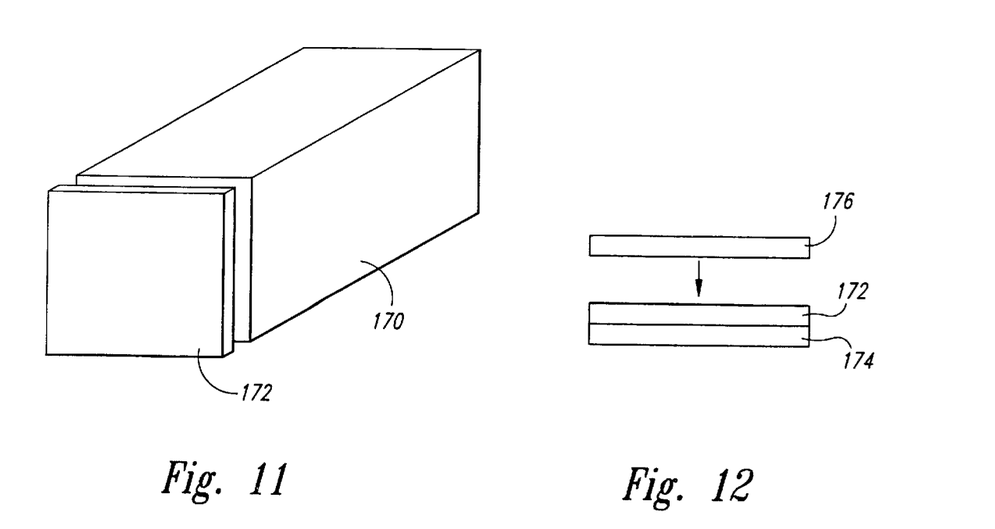
FIG. 11 is an isometric view showing the rectangular fiber block produced in the mold of FIG. 10 being formed into slices for use as a field emission display spacer or a field emission display microchannel plate.
FIG. 12 is a cross-sectional view of a field emission display showing the slice produced according to the method of FIG. 11 being used as a spacer or a microchannel plate.

With reference to FIG. 11, the rectangular block 170 is divided into thin slices 172. These thin slices 172 are then attached to a field emission display faceplate 174 and exposed to a suitable etchant. When used to form field emission display spacers, the material corresponding to the cladding 94 (FIG. 4) is etched away thereby leaving a large number of parallel, extremely fine strands that are accurately spaced apart from each other. When used to form a microchannel plate for a field emission display, the slice 172 forms a plurality of equally spaced, generally cylindrical passages corresponding to the cladding 94 (FIG. 4). After the material corresponding to either the core 92 or the cladding 94 has been etched, a field emission display baseplate 176 is moved downwardly as indicated by the arrow against the upper surface of the slice 172.

As is well known in the art, it is very important that the spacer fibers of a field emission display or the channels of a microchannel plate for a field emission display be accurately positioned relative to the components of the field emission display, such as emitters (not shown). Any significant distortion from a hexagonal shape as the single fibers 102 are molded as illustrated in FIG. 6 would cause a corresponding distortion of the spacing of the single fibers 102. This distortion would adversely effect the uniformity of field emission display spacers or microchannel plate channels fabricated in accordance with the preferred embodiment of the invention described herein. However, since the preferred embodiment of the inventive mold can be used to accurately form hexagonal and half-hexagonal multiple fiber preforms, uniformly spaced field emission display spacers and field emission display microchannels can be formed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of forming a plurality of spacers for a flat panel display having a planar substrate and a planar faceplate adapted to be positioned in parallel relationship, the method comprising:

providing a plurality of single fibers each having an inner core and an outer cladding, the outer cladding being formed from different materials in which the outer cladding is selectively removable from the inner core;

placing a plurality of the single fibers into a mold base of a first mold, the mold base having an upwardly facing lower cavity defined by a bottom surface and a pair of side walls, the bottom surface and side walls of the mold base together defining one-half of a hexagon;

placing a unitary mold cover over the mold base, the unitary mold cover having a downwardly facing upper cavity defined by an integrally formed top surface and a pair of side walls, the top surface and side walls of the mold cover together defining one-half of a hexagon, the mold base and mold cover interfitting so that the one-half-hexagon formed by the mold base and the one-half-hexagon formed by the mold cover together form a hexagonal mold cavity, the single fibers being molded in the mold cavity into a hexagonal multiple fiber preform;

removing the hexagonal multiple fiber preform from the mold cavity;

drawing the hexagonal multiple fiber preform to reduce its cross-sectional area and increase its length thereby forming a hexagonal multiple fiber;

dividing the hexagonal multiple fiber into a plurality of pieces;

placing the pieces of hexagonal multiple fiber into a mold cavity of a second mold, the mold cavity being defined by a bottom surface and a pair of side walls;

placing a mold cover over the mold cavity of the second mold so that it intersects the side walls of the mold base, the pieces of hexagonal multiple fiber being molded in the mold cavity into a fiber block;

dividing the fiber block into a plurality of slices having parallel end surfaces;

attaching an end surface of a slice to one of the substrate and the faceplate of the flat panel display;

selectively removing the outer cladding from the inner core, thereby leaving the inner core attached between the substrate and the faceplate of the flat panel display; and attaching the other end surface of a slice to the other of the substrate and the faceplate of the flat panel display.

2. The method of claim 1, further comprising the step of forcing the mold base and the mold cover of the first mold together to compress the single fibers in the mold cavity into the multiple fiber preform having a hexagonal cross-sectional shape.

3. The method of claim 2, further comprising the step of heating the single fibers while the single fibers are being compressed.

4. The method of claim 1, further comprising the step of forcing the mold base and the mold cover of the second mold together to compress the multiple fibers in the mold cavity and form the fiber block.

5. The method of claim 4, further comprising the step of heating the multiple fibers while the multiple fibers are being compressed.

6. A method of forming a plurality of spacers for a flat panel display having a planar substrate and a planar faceplate adapted to be positioned in parallel relationship, the method comprising:

providing a mold including a mold cavity defined by a bottom surface and a pair of side walls;

providing a plurality of hexagonal and half-hexagonal multiple fibers;

placing a plurality of the hexagonal and half-hexagonal multiple fibers into the mold cavity, the half-hexagon multiple fibers being arranged to fill respective spaces formed between adjacent hexagon multiple fibers and the bottom surface of the mold cavity, each of the hexagonal multiple fibers including a plurality of single fibers each having an inner core and an outer cladding, the outer cladding being formed from different materials in which the outer cladding is selectively removable from the inner core;

placing a mold cover over the mold cavity so that it intersects the side walls of the mold cavity, the multiple fibers being molded in the mold cavity into a fiber block;

dividing the fiber block into a plurality of slices having parallel end surfaces;

attaching an end surface of a slice to one of the substrates and the faceplate of the flat panel display;

selectively removing the outer cladding from the inner core, thereby leaving the inner core attached to one of the substrate and the faceplate of the flat panel display; and attaching the other end surface of a slice to the other of the substrate and the faceplate of the flat panel display.

7. The method of claim 6, further comprising the step of forcing the mold cover into the mold cavity to compress the multiple fibers in the mold cavity.

8. The method of claim 7, further comprising the step of heating the multiple fibers while the multiple fibers are being compressed.

9. The method of claim 6 wherein the step of providing a plurality of hexagonal multiple fibers comprises:

providing a mold including a mold base having an upwardly facing lower cavity defined by a bottom surface and a pair of side walls, the bottom surface and side walls of the mold base together defining one half of a hexagon, the mold further including a unitary mold cover having a downwardly facing upper cavity defined by an integrally formed top surface and a pair of side walls, the top surface and side walls of the mold cover together defining one half of a hexagon, the upper and lower cavities together forming a mold cavity;

placing a plurality of single fibers into the mold cavity;

placing the mold cover on the mold base, the single fibers being molded in the mold cavity into a multiple fiber preform having a hexagonal cross-section;

removing the hexagonal multiple fiber preform from the mold cavity;

drawing the hexagonal multiple fiber preform to form a hexagonal multiple fiber having a reduced cross-sectional area and an increased length; and dividing the hexagonal multiple fiber mass into a plurality of pieces.

10. The method of claim 9, further comprising the step of forcing the mold base and the mold cover together to compress the single fibers in the mold cavity.

11. The method of claim 9 wherein the hexagonal multiple fibers are formed from single fibers that are identical to single fibers forming the half-hexagon multiple fibers.

12. A method of forming a plurality of spacers for a flat panel display having a planar substrate and a planar faceplate adapted to be positioned in parallel relationship, the method comprising:

providing a plurality of single fibers each having an inner core and an outer cladding, the outer cladding being formed from different materials in which the outer cladding is selectively removable from the inner core;

placing a plurality of the single fibers into a hexagonal mold cavity, the single fibers being molded in the mold cavity into a hexagonal multiple fiber preform;

removing the hexagonal multiple fiber preform from the mold cavity;

drawing the hexagonal multiple fiber preform to reduce its cross-sectional area and increase its length thereby forming a hexagonal multiple fiber;

dividing the hexagonal multiple fiber into a plurality of pieces;

placing the pieces of hexagonal multiple fiber into a mold cavity of a second mold, the pieces of hexagonal multiple fiber being molded in the mold cavity of the second mold into a fiber block;

dividing the fiber block into a plurality of slices having parallel end surfaces;

attaching an end surface of a slice to one of the substrate and the faceplate of the flat panel display;

selectively removing the outer cladding from the inner core, thereby leaving the inner core attached between the substrate and the faceplate of the flat panel display; and attaching the other end surface of a slice to the other of the substrate and the faceplate of the flat panel display.

13. The method of claim 12 further comprising compressing the single fibers in the hexagonal mold cavity.

14. The method of claim 13, further comprising heating the single fibers while the single fibers are being compressed.

15. The method of claim 12 further comprising compressing the multiple fiber in the mold cavity of the second mold.

16. The method of claim 15, further comprising heating the multiple fibers while the multiple fibers are being compressed.

17. A method of forming a plurality of spacers for a flat panel display having a planar substrate and a planar faceplate adapted to be positioned in parallel relationship, the method comprising:

placing a plurality of hexagonal and half-hexagonal multiple fibers into a mold cavity, the half-hexagon multiple fibers being arranged to fill respective spaces formed between adjacent hexagon multiple fibers and a wall of the mold cavity, each of the hexagonal multiple fibers including a plurality of single fibers each having an inner core and an outer cladding, the outer cladding being formed from different materials in which the outer cladding is selectively removable from the inner core, the multiple fibers being molded in the mold cavity into a fiber block;

dividing the fiber block into a plurality of slices having parallel end surfaces;

attaching an end surface of a slice to one of the substrates and the faceplate of the flat panel display;

selectively removing the outer cladding from the inner core, thereby leaving the inner core attached to one of the substrate and the faceplate of the flat panel display; and attaching the other end surface of a slice to the other of the substrate and the faceplate of the flat panel display.

18. The method of claim 17, further comprising compressing the multiple fibers in the mold cavity.

19. The method of claim 18, further comprising heating the multiple fibers while the multiple fibers are being compressed.

20. A method of forming a plurality of spacers for a flat panel display having a planar substrate and a planar faceplate adapted to be positioned in parallel relationship, the method comprising:

placing a plurality of hexagonal multiple fibers into a mold cavity, each of the hexagonal multiple fibers including a plurality of single fibers each having an inner core and an outer cladding, the outer cladding being formed from different materials in which the outer cladding is selectively removable from the inner core, the multiple fibers being molded in the mold cavity into a fiber block;

dividing the fiber block into a plurality of slices having parallel end surfaces;

attaching an end surface of a slice to one of the substrates and the faceplate of the flat panel display;

selectively removing the outer cladding from the inner core, thereby leaving the inner core attached to one of the substrate and the faceplate of the flat panel display; and attaching the other end surface of a slice to the other of the substrate and the faceplate of the flat panel display.

21. The method of claim 20, further comprising compressing the multiple fibers in the mold cavity.

22. The method of claim 21, further comprising heating the multiple fibers while the multiple fibers are being compressed.

* * * * *

UNITED STATES PATENT AND TRADEMARK OFFICE
CERTIFICATE OF CORRECTION

PATENT NO. : 5,906,037
DATED : May 25, 1999
INVENTOR(S) : Elledge et al.

It is certified that error appears in the above-identified patent and that said Letters Patent is hereby corrected as shown below:

<u>Column 2,</u>
Line 1, "defme"-- define --

Signed and Sealed this

Fourth Day of December, 2001

Attest:

*Nicholas P. Godici*

NICHOLAS P. GODICI
*Attesting Officer*   *Acting Director of the United States Patent and Trademark Office*